US006636976B1

(12) United States Patent
Grochowski et al.

(10) Patent No.: US 6,636,976 B1
(45) Date of Patent: Oct. 21, 2003

(54) MECHANISM TO CONTROL DI/DT FOR A MICROPROCESSOR

(75) Inventors: Edward T. Grochowski, San Jose, CA (US); David Sager, Portland, OR (US); Vivek Tiwari, Foster City, CA (US); Ian Young, Portland, OR (US); David J. Ayers, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 09/608,748

(22) Filed: Jun. 30, 2000

(51) Int. Cl.⁷ .................................. G06F 1/32
(52) U.S. Cl. ..................................... 713/320
(58) Field of Search ................. 713/300, 320, 713/322–330, 501, 600, 601

(56) References Cited

U.S. PATENT DOCUMENTS 5,392,437 A    2/1995    Matter et al.
5,457,790 A   10/1995    Iwamura et al.
5,719,800 A    2/1998    Mittal et al.
5,948,106 A    9/1999    Hetherington et al.

Primary Examiner—Thomas M. Heckler
(74) Attorney, Agent, or Firm—Michael J. Nesheiwat

(57) ABSTRACT

The present invention provides a mechanism for adjusting the activity of an integrated digital circuit such as a processor to reduce voltage changes attributable to current changes triggered by clock gating. The processor includes one or more functional units and a current control circuit that monitors activity states of the processor's functional units to estimate the current consumed over n clock cycles. The current control circuit estimates the current change for a given clock cycle from the n activity states and compares the estimated current change with first and second thresholds. The processors activity is decreased if the estimated current change is greater than the first threshold, and the processor activity is decreased if the estimated current change is less than the second threshold.

19 Claims, 6 Drawing Sheets

US 6,636,976 B1

MECHANISM TO CONTROL DI/DT FOR A MICROPROCESSOR

BACKGROUND OF THE INVENTION

1. Technical Field

The present invention relates to computers and, in particular, to mechanisms for controlling the rate at which power supply current changes in a microprocessor.

2. Background Art

Modern processors include extensive execution resources to support concurrent processing of multiple instructions. A processor typically includes one or more integer, floating point, branch, and memory execution units to implement integer, floating point, branch, and load/store instructions, respectively. In addition, integer and floating point units typically include register files to maintain data relatively close to the processor core. One drawback to providing a processor with extensive execution resources is that significant amounts of power are required to run them. Different execution units may consume more or less power and draw more or less current, depending on their size and the functions they implement, but the net effect of packing so much logic onto a relatively small process chip is to create the potential for significant power supply and power dissipation problems.

Few programs require the full range of a processor's execution resources for significant time intervals. The power dissipated running a program depends on the nature of its component instructions and their potential for being executed in parallel. Programs typically include a variety of instruction types, but it is rare that enough instructions of the correct type are available to keep all of the processor's execution resources busy for significant time periods. For this reason, most processors employ a clock gating mechanism to cut off the clock delivered to execution resources when they are not being used. In addition, different components of an execution resource can be turned on and off as instructions enter and exit the pipe stage serviced by the component. Clock gating reduces power consumption, but it can also cause rapid changes in the current provided to the processor. These current changes can alter the voltage at which the processor logic operates.

Clock signals are typically delivered to the processor's execution resources through a clock distribution network. The clock signal is used to synchronize the charging and discharging of nodes in the processor logic between supply voltage levels, e.g, $V_{cc}$ and ground. The logic is designed to operate within specified ranges of these voltage levels, which are maintained by a regulated power supply. Sudden changes in the current drawn by the processor as functional units are gated on or off, can cause these supply voltages to vary. The voltage variations are due to the finite response time of the power supply as well as reactive (inductive and capacitive) elements in the power distribution network. If the voltage variations fall outside the specified range, they can damage circuits (for voltage excursions above a maximum safe value) or create errors (for voltage excursions below a level necessary to guarantee correct operation of the logic).

The significance of these voltage excursions is determined by the rate at which the current provided to the processor by the power supply changes ("current change rate" or "di/dt") and the electrical properties of the distribution network. For processors that implement clock gating, the current change rate depends on both the size of the current change and the time scale over which it occurs. The latter is determined by the operating frequency of the processor. The former depends on the amount of current consumed by the functional unit(s) being gated. For example, floating point multiply units are notoriously power-hungry execution resources in processors. The change in the processor's current demand as these units are gated on and off can move the reference voltage temporarily outside its specified range.

Currently available processors offer no control over di/dt. One strategy contemplated for future processors forces a minimum level of activity to ensure that any current changes are relatively small. As processor frequencies increase, the time interval over which these current changes occur decreases, and even small current changes may affect the supply voltages. On the other hand, the use of power reduction strategies like clock-gating is increasing as processor frequencies (and power consumption) increase. Forcing minimum activity levels artificially raises power consumption levels, which partially offsets the benefits of clock gating.

The present invention addresses these and other deficiencies of available power throttling mechanisms.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1:
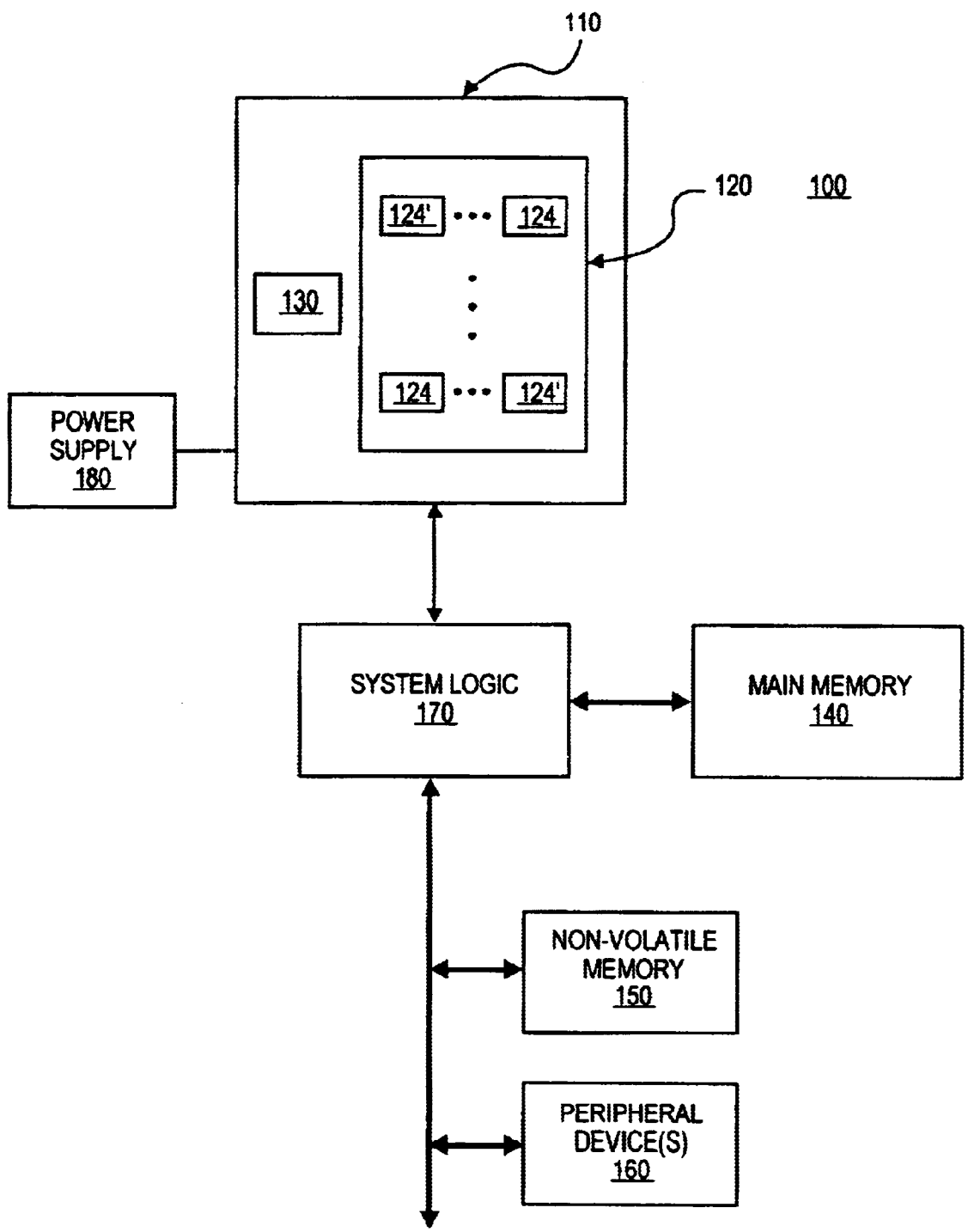
FIG. 1 is a block diagram of one embodiment of a computer system in which the present invention is implemented.

FIG. 1 is a block diagram of one embodiment of a computer system 100 in which the present invention may be implemented. Computer system 100 includes a processor 110, a main memory 140, a non-volatile memory 150, various peripheral devices 160, system logic 170, and a power supply 180. System logic 170 controls data transfers among processor 110, main memory 140, non-volatile memory 150, and peripheral devices 160. Power supply 180 provides reference voltages for logic devices in processor 110. Computer system 100 is provided to illustrate various features of the present invention. The particular configuration shown is not necessary to implement the present invention. For example, system 100 may include multiple processors 110 or various components may be combined or eliminated.

Processor 110 includes multiple functional units 124, which form an instruction execution pipeline 120. Instructions are provided to processor 110 from main memory 140 and non-volatile memory 150. The amount of current used by processor 110 is determined by the level of activity in various functional units 124 generated by the instructions (or lack thereof) in pipeline 120. A current control unit (CCU) 130 monitors current use by selected functional units 124 in response to the processed instructions and adjusts the activity level of processor 110 accordingly.

As an instruction is staged down pipeline 120, it directs various functional units 124 to perform one or more operations that, taken together, implement the instruction. For example, a floating-point multiply-accumulate instruction (FMAC) may cause the following operations to occur in the indicated resources: a floating point register file reads out three operands; an FMAC execution unit multiplies two of the operands and adds the product to the third operation; an exception unit checks the product and sum for errors; and a retirement unit writes the result to the floating point register file if no errors are detected. Depending on the particular processor implementation, these resources or their components may be grouped into one or more functional units 124 which are turned on and off as the instruction is staged down the pipeline.

Each functional unit 124 draws a certain amount of current when it is activated by the instruction. For computer system 100, power supply 180 provides the current while maintaining the reference voltage level within a specified range. If activation or deactivation of one or more functional units 124 triggers a significant change in the current demanded by processor 110, it will be difficult for power supply 180 to maintain the appropriate reference voltage level. The present invention provides a mechanism to reduce the impact of current changes on the reference voltage used by processor 110.

For one embodiment of the present invention, the activated/deactivated state of selected functional units 124' are monitored. Selected functional units 124' may be those that draw large currents when active, because these are likely to create sharp changes in di/dt when they are switched between their activate and inactivate states. CCU 130 monitors the state of one or more selected functional units 124' on successive clock cycles to estimate a current change over the interval of clock cycles. The estimated current change is compared with a threshold value to determine whether the activity level of the processor should be adjusted. For example, if the current change is increasing faster than a first threshold, the flow of instructions through pipeline 120 may be reduced. If the estimated current change rate is decreasing faster than a second threshold, a functional unit 124' that might otherwise be deactivated can be left activated to slow the current drop.

The current change may be estimated by tracking the active/inactive state (activity state=1/0, for example) of a selected functional unit 124' on n-successive clock cycles. The n-activity states may be analyzed to provide an estimated current change for the n-clock cycle interval. For example, each of the n-activity states may be weighted according to its proximity to the current clock cycle, and the weighted activity states may be summed to provide an estimate of the current change.

For another embodiment of the invention, CCU 130 may monitor current changes in multiple functional units 124'. For this embodiment, the activity state of a functional unit 124' may be weighted according to the current it draws when active. A total activity state for a given clock cycle is determined by the sum of weighted values for each functional unit 124' that is monitored. The total activity states for the n-clock cycle interval is analyzed to determine an estimated current change. Current changes may be determined on a clock by clock basis, using a sliding window of n activity states.

Current weights for selected functional units 124' may be determined through a calibration process. For example, CCU 130 may be calibrated once as a part of the design process or it may be self-calibrating. In the latter case, CCU 130 may employ current monitoring circuitry and a calibration algorithm periodically to adjust current weights for each functional unit.

Figure 2:
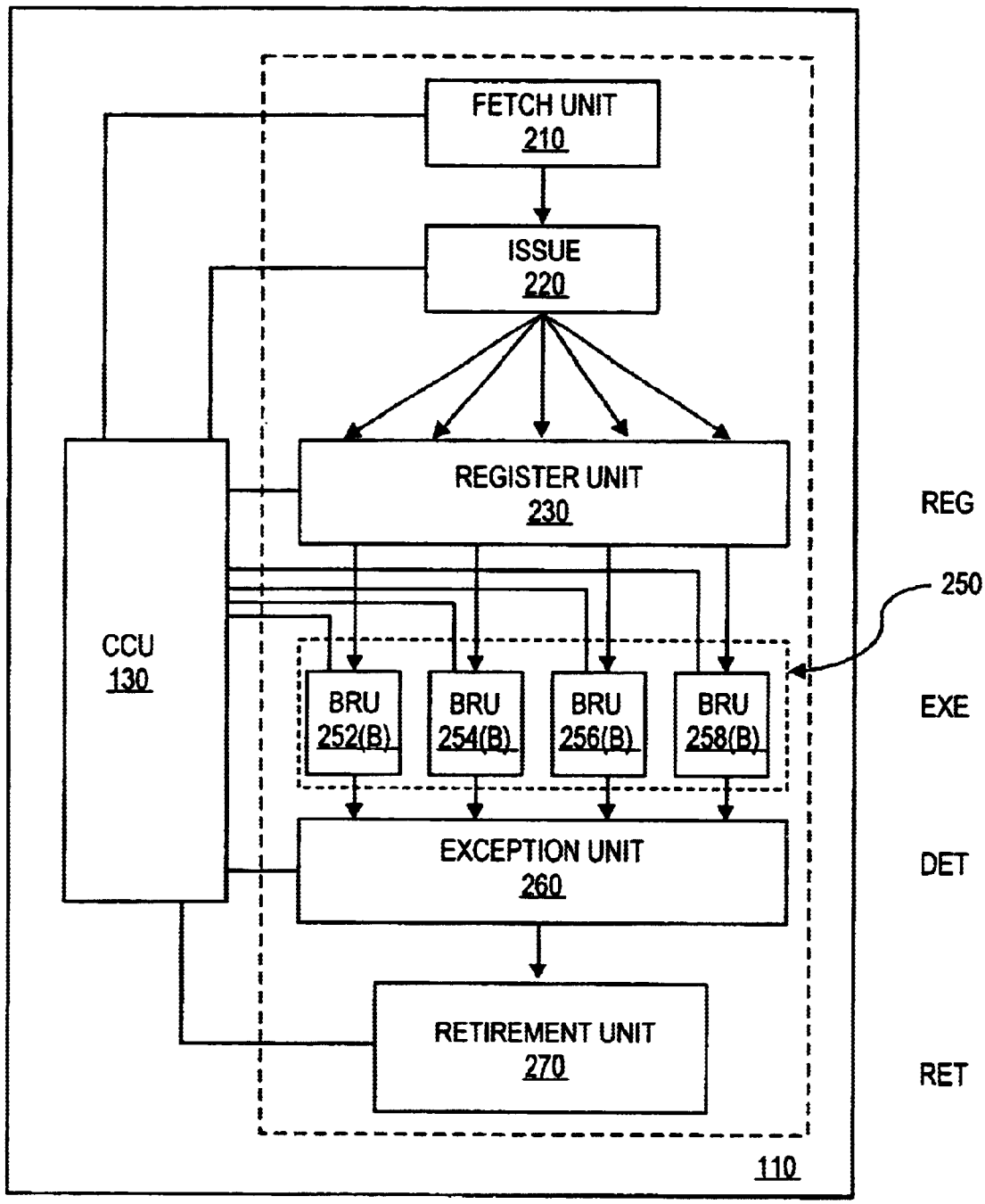
FIG. 2 is a block diagram of one embodiment of a processor that implements a current control unit in accordance with the present invention.

FIG. 2 represents in greater detail one embodiment of processor 110. For the disclosed embodiment of processor 110, pipeline 120 is represented as fetch (FET), expand (EXP), register (REG), execution (EXE), detect (DET), and retirement (RET) stages, respectively, and the execution resources corresponding to each stage are indicated. The present invention does not require partition of processor 110 into a particular set of pipeline stages. For example, a disclosed stage may be subdivided into two or more stages to address timing issues or facilitate higher processor clock speeds. Alternatively, two or more stages may be combined into a single stage. Other embodiments may include hardware for processing instructions out-of-order. The disclosed pipeline provides only one example of how operations may be partitioned in a processor implementing the present invention.

The front end of pipeline 120 includes fetch unit 210 and issue unit 220, which provide instructions to execution units in the back end of pipeline 120 for execution. Fetch unit 210 retrieves instructions from memory 140 directly or through a local cache (not shown) and provides the fetched instructions to issue unit 220. Issue unit 220 decodes the instructions and issues them to the execution resources in the back end of pipeline 120.

Throughout this discussion, the term "instruction" is used generally to refer to instructions, macro-instructions, instruction bundles or any of a number of other mechanisms used to encode processor operations. For example, the decode operation may transform a macro-instruction into one or more micro-operations ($\mu$ops), resolve an instruction bundle into one or more instruction syllables, or retrieve a micro-code sequence associated with an instruction.

The back end of pipeline 120 includes register unit 230, execution unit 250, exception unit 260 and retirement unit 270. Register unit 230 includes a register rename unit and various register files (not shown) to identify the registers specified in the instructions and to accesses the data from the identified registers, respectively. Execution unit 250 includes one or more branch execution units (BRU) 252, integer execution units (IEU) 254, load/store units (LSU) 256, and floating point execution units (FPU) 258 to process branch, integer, load/store, and floating point instructions. Exception unit 260 checks the results generated by execution units 250 and adjusts the control flow if an exceptional condition is encountered. If no exceptional conditions are detected, retirement unit 270 updates the architectural state of processor 110 with the results.

The functional units 124 of FIG. 1 that are activated by different instructions may represent various combinations and subsets of the execution resources indicated for pipeline 120. CCU 130 monitors activity states for selected functional units 124', estimates current changes from the monitored activity states, and adjusts the activity level of processor 110 accordingly. For example, one functional unit 124' may include a floating-point register (in register unit 230), and FPU 258 may have components in two or more functional units. In general, a selected functional unit 124' includes various execution resources (register files, execution units, tracking logic) that are activated and deactivated together and draw a relatively large current when activated. The present invention does not depend on the detailed mapping between the functional units 124, 124' and the execution resources shown in FIG. 2.

Figure 3:
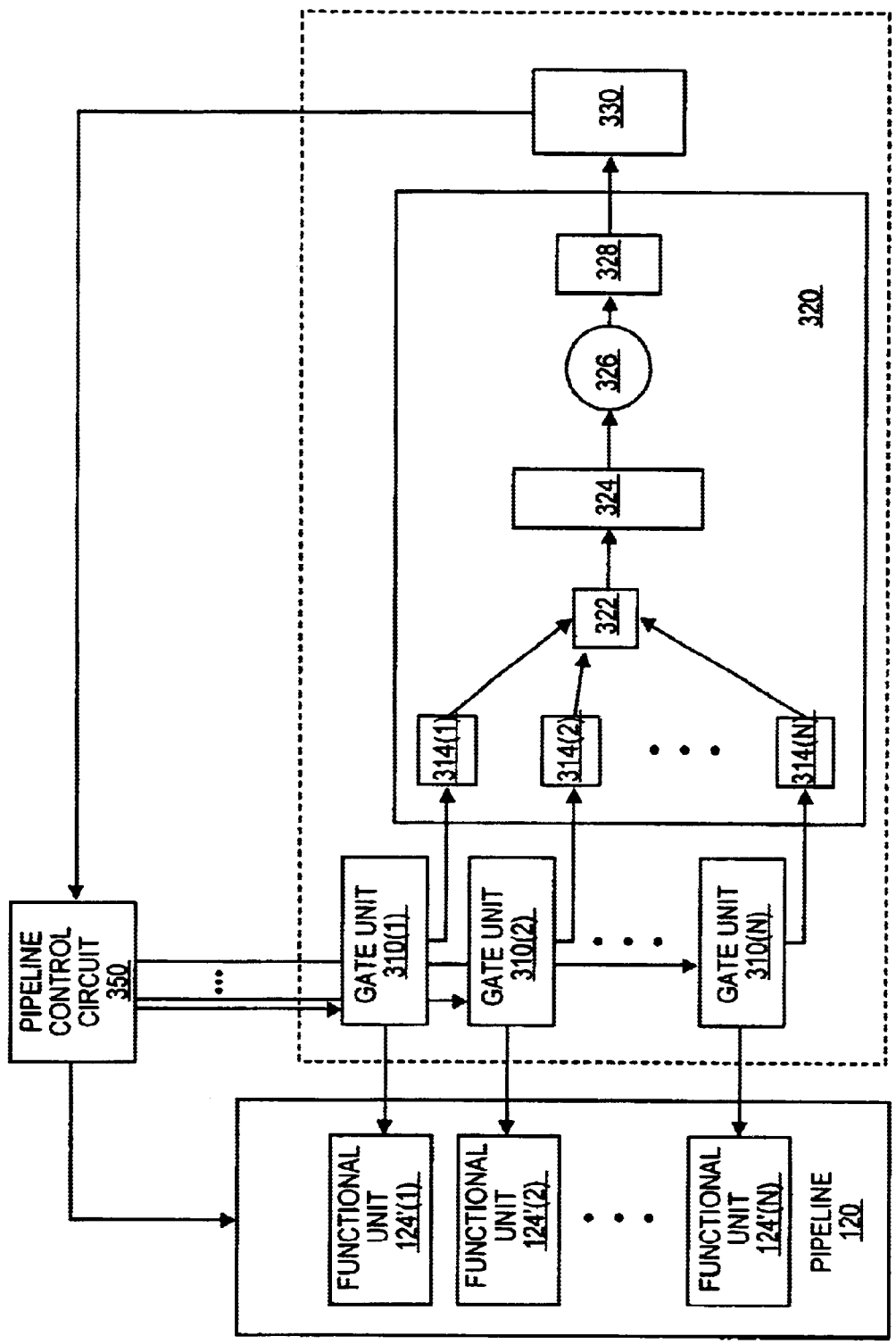
FIG. 3 is a block diagram of one embodiment of the current control unit implemented by the processor of FIG. 2.

FIG. 3 is a block diagram representing one embodiment of CCU 130 and its interactions with selected functional units 124' of pipeline 120. The disclosed embodiment of CCU 130 includes gate units 310(l)–310(n) (generically, gate unit 130), a monitor circuit 320, and a throttle circuit 330. Each gate unit 310 controls power delivery to an associated functional unit 124' in pipeline 120. For example, gate unit 310 may be a clock gating circuit that couples or decouples a clock signal to functional unit 124' according to whether or not the services of functional unit 124' are used to implement an instruction currently in the pipe stage(s) in which functional unit 124' operates. Also shown in FIG. 3 is a pipeline control circuit 350 which indicates to gate units 310 which functional units 124' are active for the currently executing instructions.

For the disclosed embodiment of CCU 130, gate unit 130 provides a signal to monitor circuit 320 to indicate whether its associated functional unit 124' is active. For example, the signal may be an activity state of functional unit 124', which is asserted when functional unit 124' is turned "on" and deasserted when functional unit 124' is turned "off". If CCU 130 handles multiple functional units 124', monitor circuit 320 may add their activity states to provide a net activity value for a given clock cycle. Embodiments of monitor circuit 320 may weight activity states to indicate the different current levels drawn by different functional units 124' being monitored.

A typical processor may include 10–20 gate units 310 to control power delivery to 10–20 functional units 124. All functional units 124 may be monitored for current changes, although the advantages of the present invention may be realized by monitoring functional units 124' that consume large amounts of current.

Monitor circuit 320 collects signals from gate units 130 over a sequence of clock cycles and determines a current change rate from the collected signals. For one embodiment of digital throttle 130, monitor circuit 320 includes weight units 314(l)–314(n) (generically, weight units 314), an adder 322, an n-stage shift register 324, an estimation circuit 326, and a threshold comparator 328. When present, each weight unit 314 provides 0 or a no-zero value to adder 322 according to whether the activity state indicated by gating circuit 310 for its associated functional unit 124' is inactive or activate, respectively. The non-zero value represents the current drawn by functional unit 124' if it is activated. Adder 322 and weight units 314 are unnecessary if CCU 130 controls a single functional unit 124'. If currents drawn by monitored functional units 124' are roughly comparable, weight units 314 may be eliminated.

Adder 322 sums the (weighted or unweighted) activity states of selected functional units 124' on each clock cycle to determine a total activity state. The total activity level is provided to a corresponding input of n-stage shift register 324. Shift register 324 stores total activity states (weighted or unweighted) for each of n-successive clock cycles to provide a profile of current consumption over n-cycles of the processor clock. Estimator circuit 326 uses the n-stage data to generate an estimate of the current change, and threshold comparator 328 compares the estimated current change with one or more threshold values. If the estimated current change exceeds the threshold value(s), throttle circuit 330 adjusts the activity level of processor 110.

Estimator circuit 326 may implement any of a number of methods to estimate di/dt from the n-clock cycle sample of total activity states provided by shift register 324. One method determines, on each clock cycle, a moving average of the processor's activity values over the n-clock cycles for which shift register 324 stores data. For this method, estimator circuit 326 determines:

$$\Delta I = (1/N) \Sigma A_N$$

Here, $A_N = \Sigma w_i \bullet a_i$, where $w_i$ is a weight 314($i$) for functional unit 124($i$) and $a_i$ is the activity state indicated by gating circuit 314($i$). For one embodiment, $a_i$ is 1 or 0 according to whether associated functional unit 124'($i$) is activated or deactivated, respectively. The summation is over all functional units controlled by CCU 130. For this embodiment of estimator circuit 326, $\Delta I$ is a running average of the current consumption and may be compared with, e.g. maximum and minimum current thresholds to determine if the processor's activity level should be adjusted. one or more appropriate threshold values.

There are tradeoffs between the stability gained by throttling di/dt and the performance and power of the processor. Throttling di/dt leads to longer execution times because the pipeline does not start up as rapidly as it does when di/dt is not limited. It leads to higher power consumption because the pipeline does not shut down as rapidly as it does when di/dt is not limited. There is also a tradeoff between performance and power for the same degree of di/dt control. By adjusting the upper and lower thresholds independently, it is possible to favor either higher performance or lower average power.

Simulations indicate that changes in the reference voltage level attributable to di/dit can be reduced with limited impact on power consumption and performance using an interval of that is approximately 25% of the period of the ringing in the power distribution network. For the clock frequencies simulated, this interval is approximately 15 clock cycles (n=15).

Another embodiment of estimator circuit 326 may implement a more sophisticated method for estimating current changes. For example, each of the n-stage activity values may be multiplied by a coefficient as follows:

$$\Delta I = C_1 \bullet A_1 + C_2 \bullet A_2 + \ldots C_{N-1} \bullet A_{N-1} + C_N \bullet A_N$$

where $C_1$ to $C_{N/2}$ are positive, $C_{N/2+1}$ to $C_N$ are negative, and lower indices refer to more recent 20 values. For this embodiment, $\Delta I$ represents a running average of the current change over the n-cycle interval rather than a running average of the current level itself.

Yet another embodiment of estimator circuit 326 employs different coefficients to the n-shift register values. For example, more recent activity values may be multiplied by higher coefficients, and less recent activity values being multiplied by lower coefficients. One set of coefficients is computed by taking the first derivative of the response of the power distribution network.

Figure 4:
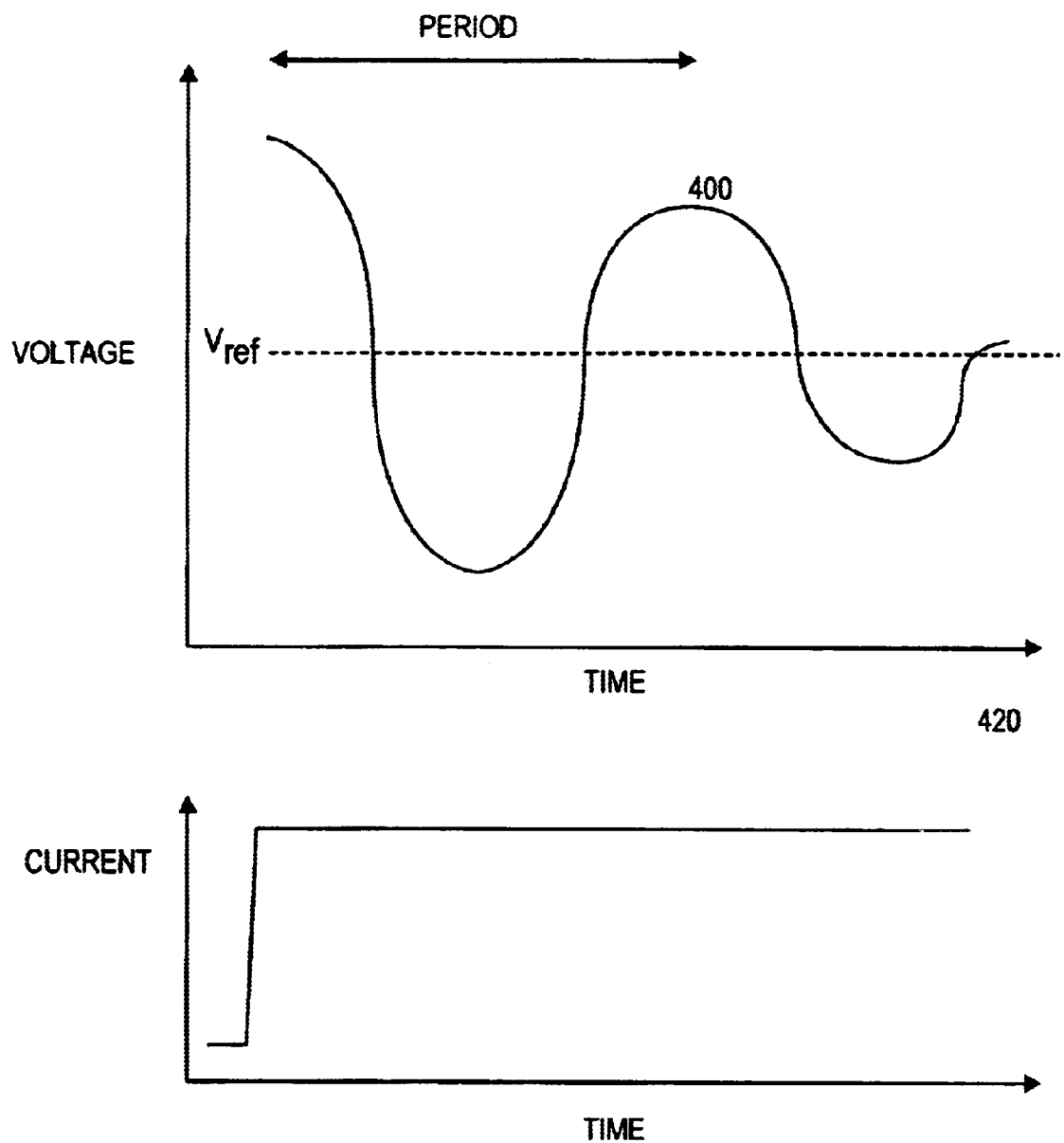
FIG. 4 is a schematic representation of a voltage level as a function of time, following a significant change in the current consumed by a processor.

FIG. 4 is a schematic representation of the settling behavior of a voltage 400 in a power distribution circuit in response to a large change in current demand. Voltage 400 "rings" for several cycles following a current change 420, before it settles to the specified level. The period and amplitude of the ringing is determined by the electrical properties (resistance, capacitance, inductance) of the distribution circuit and the slope (di/dt) of the current change. Because current change 420 occurs very rapidly, it is indicated as a step in FIG. 4. The unequal coefficients for the above-described embodiment of estimator circuit 326 may be derived from the first derivatives of voltage 400 at various points on the curve.

One embodiment of comparator 328 compares the value of ΔI provided by estimator circuit 326 with first and second thresholds. Depending on the method used to determine ΔI, the thresholds may represent maximum and minimum values for the current ($i$) or maximum positive and negative values of di/dt. If ΔI is larger than the first threshold, throttle circuit 330 reduces processor activity. This may be done, e.g., by injecting bubbles into execution pipeline 120. Here, "bubble" refers to a lack of activity in the execution pipeline such as when a no-operation (NOP) propagates through the pipeline stages. Another embodiment may activate a charge pump when ΔI is larger than the first threshold. The charge pump provides additional voltage drive to the processor to compensate for the spike in current demand. If ΔI is less than the second threshold, throttle circuit 330 increases activity in execution pipeline 120. This may be done, e.g., by maintaining in their active states one or more functional units 124' that could otherwise be deactivated.

Figure 5:
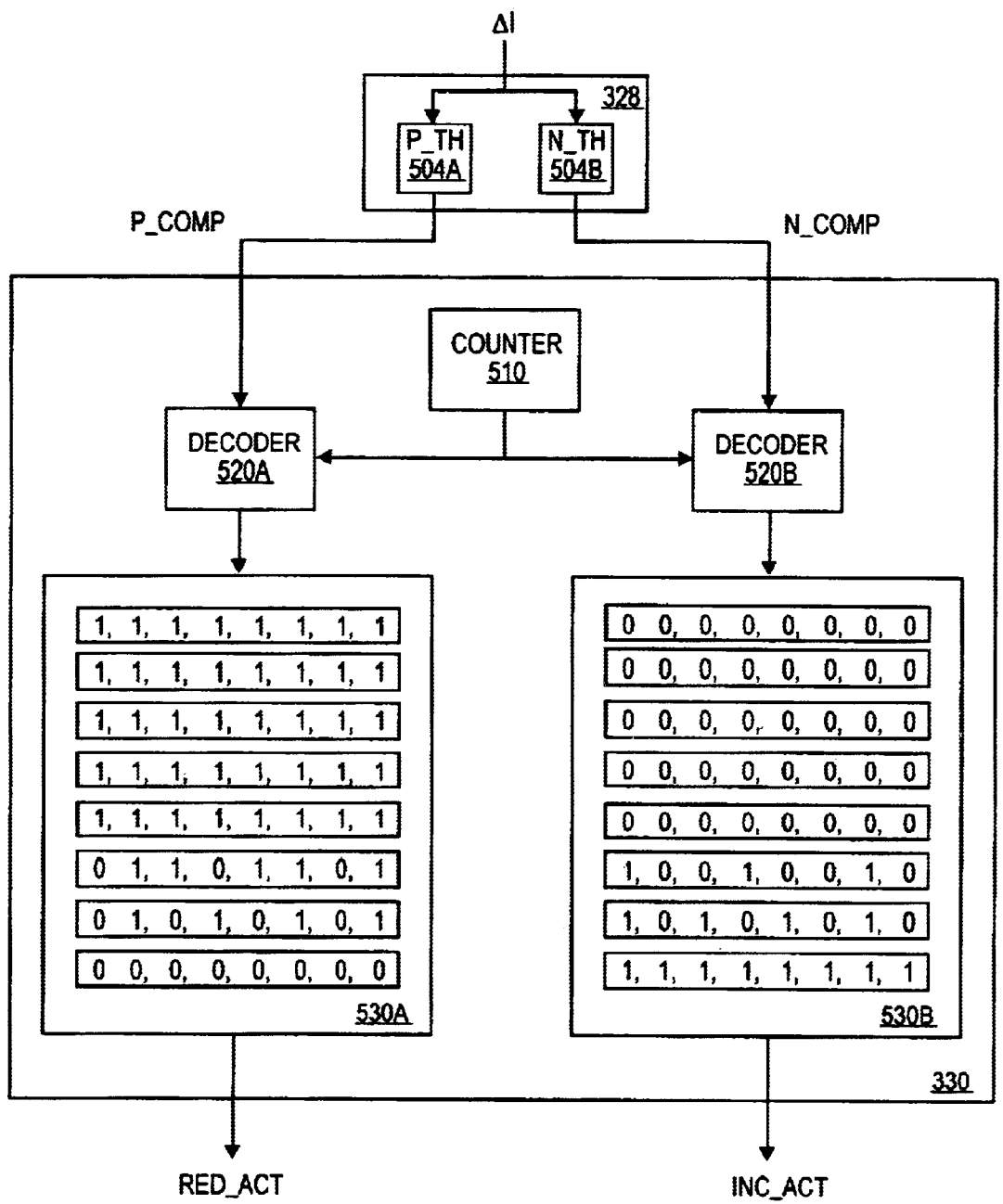
FIG. 5 is a block diagram representing one embodiment of the throttle circuit of FIG. 3.

FIG. 5 is a schematic representation of one embodiment of throttle circuit 330 to adjust the activity level of a processor, responsive to a comparison between an estimated current change (or current) and one or more threshold levels. Also shown is an embodiment of comparator 328 that includes a positive threshold comparators (P_TH) 504($a$) and negative threshold comparator (N_TH) 504($b$) to compare ΔI with maximum positive and negative current changes, respectively. The results of these comparisons are indicated by output signals P_COMP and N_COMP.

The disclosed embodiment of throttle circuit 330 includes a counter 510, decoders 520($a$) and 520($b$), and associated memory devices 530($a$) and 530($b$), respectively. Memory devices 530($a$), 530($b$) may be, for example, read only memory devices (ROM). Different entries of memory device 530($a$) are accessed through decoder 520($a$) in response to a timing indication from counter 510 and comparison signal N_COMP. Similarly, different entries of memory device 530($b$) are accessed through decoder 520($b$) in response to a timing indication from counter 510 and comparison signal P_COMP.

For the disclosed embodiment of throttle circuit 330, counter 510 is a modulo-8 counter. The output of counter 510 increments column indices in decoders 520($a$) and 520($b$) from 0–8 on successive clock cycles and back to 0 when 8 is reached. P_COMP is a first output signal of comparator 328 that represents the result of a comparison between the estimated ΔI and a first threshold value. P_COMP is used to adjust a row index in decoder 520($a$) according to the relative sizes of ΔI and the first threshold. For example, the first threshold value may represent a maximum positive current change, $\Delta I_{p\_MAX}$, and P_COMP is scaled to select a row between 1 and 8, with higher row numbers being selected as ΔI approaches and then exceeds $\Delta I_{p\_MAX}$. Higher number rows have more 0s in memory device 530($a$).

The output of memory device 530($a$) is a signal, RED_ACT, that may be used to control activity reducing operations in the processor. For the disclosed embodiment of memory device 520($a$), the probability that RED_ACT is a one decreases as P_COMP increases, i.e. as the size of ΔI increases relative to $\Delta I_{p\_MAX}$. RED_ACT may be used to enable issue unit 220 (FIG. 2) when it is one and disable issue unit 220 when it is zero. When enabled, issue unit 220 issues instructions according to its normal operation. When disabled, issue unit 220 issues no instructions, injecting bubbles (no-ops or NOPs) into pipeline 120. NOPs trigger operations by few if any functional units 124 as they propagate down pipeline 120.

N_COMP is a second output signal of comparator 328 that represents the result of a comparison between the estimated ΔI and a second threshold value. The second threshold value may represent a maximum negative current change, $\Delta I_{p\_MIN}$. For one embodiment, N_COMP is scaled to adjust a row index in decoder 520($b$) to a value between 1 and 8 with higher values being favored as ΔI decreases below $\Delta I_{p\_MIN}$. Higher numbered rows have more Is than lower numbered rows. The output of memory device 530($b$), INC_ACT, may be used to control activity increasing operations in the processor. For example, INC_ACT may be used to disable clock gating for a functional unit, so it remains active (and draws current) even if no instruction currently needs it.

Figure 6:
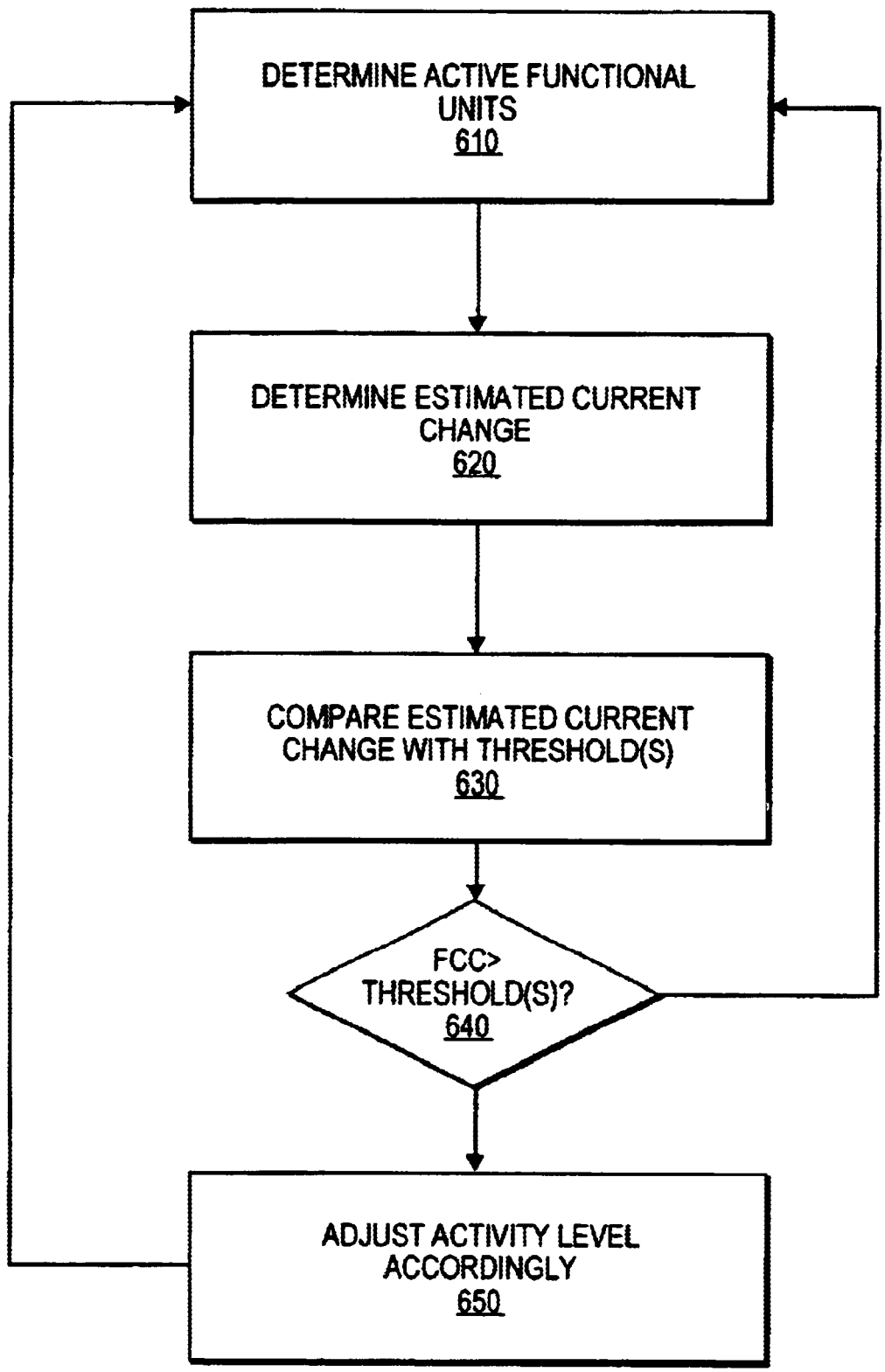
FIG. 6 is a flowchart representing a method in accordance with the present invention for adjusting the activity level of a processor to reduce current changes in the processor.

FIG. 6 is a flowchart representing a method 600 in accordance with the present invention for controlling current changes in a processor. Method 600 first determines 610 which of the selected functional units in the processor are active. The state (active/inactive) of a functional unit may be indicated, for example, by a signal from a clock gating circuit that provides power to the function unit. The gating circuit may assert the signal if it is providing power to the function unit (active state), and it may deassert the signal if it is not currently providing power to the functional unit (inactive state).

Once the active functional units have been determined 610, a current change is estimated 620 for the processor. Where multiple functional units are being monitored, the activity states of the functional units may be weighted according to the current they consume when active. The weighted activity states are summed to provide a total activity state, which may be tracked over an n-clock cycle interval. An estimated current change for a given clock cycle may be determined by analyzing the n total activity states.

The estimated current change is compared 630 with one or more threshold levels. The threshold levels may represent, for example, maximum positive and negative current changes for the interval. If the estimated current change falls outside the range defined by these thresholds, the activity level of the processor is adjusted accordingly. For example, if the estimated current change is greater than the maximum positive current change, the instruction throughput may be reduced by injecting bubbles into the processor's pipeline. If the estimated current change exceeds the minimum negative current change, clock gating may be disabled for the appropriate functional unit accumulated power. If the estimated current change falls within the allowed range, instruction issue and clock gating operate in their normal modes.

The instruction throughput of processor may be reduced through a number of mechanisms. For one embodiment of method 600, bubbles may be injected into the instruction execution pipeline to reduce the fraction of clock cycles for which the processor's functional units are active. Bubbles may be introduced by, for example, triggering the issue unit to issue instructions on only selected cycles of the processor clock. For another embodiment of the invention, the frequency at which the processor's clock is operated may be reduced.

There has thus been disclosed a mechanism for controlling the current change rate ("di/dt") of a processor by monitoring the activity state of one or more of the processor's functional units over a specified interval. An estimated current change is determined from the monitored activity states, and the activity level of the processor is adjusted if the estimated current change exceeds a threshold value. The current change may be estimated by tracking the active functional units on successive clock cycles, and extracting an estimated current change rate from the changes in this number over a given number of clock cycles.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A processor comprising:
   a functional unit;
   a gating circuit to control power delivery to the functional unit and to indicate an activity state of the functional unit over a sequence of clock cycles;
   a monitor circuit to determine a current change from the indicated activity states and to compare the determined current change with a threshold, wherein the monitor circuit includes a shift register to store indicated activity states for n-successive clock cycles of the processor and the current change is determined by a weighted sum of the activity states on successive clock cycles; and
   a throttle circuit to adjust an activity level of the processor if the determined change exceeds the threshold, wherein the threshold is a first threshold to indicate a maximum positive current change rate and a second threshold to indicate a maximum negative current change rate,
   the throttle circuit includes a first duty cycle table, rows of which indicate specified ratios of active/inactive states for the gating circuit, and a current row is selected to drive the gating circuit according to the comparison between the determined and threshold current change rates.

2. The processor of claim 1, wherein the functional unit comprises a plurality of functional units that form a portion of an instruction execution pipeline for the processor.

3. The processor of claim 2, wherein the gating circuit comprises a plurality of gating circuits, each gating circuit to control power delivery to a corresponding one of the plural functional units.

4. The processor of claim 1, wherein the throttle circuit injects bubbles into the instruction pipeline when the determined rate exceeds the first threshold and the throttle circuit injects activity into the instruction pipeline when the determined rate exceeds the second threshol.

5. A method for controlling a current change rate in a processor comprising:
   collecting activity state signals from one or more gating circuits of the processor on n-successive clock cycles of the processor;
   estimating a current change from the n collected activity state signals, wherein estimating the current change comprises evaluating a weighted sum of the n collected activity states;
   comparing the estimated current change with a threshold current change, wherein comparing comprises comparing the estimated current change with first and second thresholds, the first and second thresholds representing maximum positive and negative current changes, respectively;
   adjusting an activity level of the processor when the estimated current change exceeds the threshold current change; and
   activating and deactivating a functional unit associated with the gating circuit, responsive to instructions in a pipeline of the processor.

6. The method of claim 5, wherein the gating circuit activates and deactivates an associated functional unit by:
   enabling a clock signal to the functional unit on those clock cycles for which an instruction uses the functional unit; and
   disabling the clock signal to the functional unit on those clock cycles for which an instruction does not use the functional unit.

7. The method of claim 5, wherein adjusting an activity level comprises:
   decreasing the activity level if the estimated current change is greater than the first threshold; and
   increasing the activity level if the estimated current change is less than the second threshold.

8. The method of claim 7, wherein decreasing the activity level comprises injecting bubbles into an instruction pipeline of the processor.

9. The method of claim 7, wherein increasing the activity level comprises maintaining a gating circuits in an active state in the absence of instructions to a functional unit associated with the gating circuit.

10. A computer system comprising:
    an instruction execution pipeline, including a functional unit, to execute instructions;
    a voltage source to provide a reference voltage to the functional unit;
    a gating circuit to activate or deactivate the functional unit and to indicate a activity state for the functional unit; and
    a monitor circuit to estimate a current change from the indicated activity state and compare it with a threshold, wherein the activity state is weighted to indicate a level of current consumption for the functional unit associated with the control circuit; and
    a throttle circuit to adjust an activity level in the instruction execution pipeline according to the comparison.

11. The computer system of claim 10, wherein instruction execution pipeline includes an issue unit that issues instructions for processing by the instruction execution pipeline at a rate determined by a processor clock.

12. The system of claim 11, wherein the throttle circuit adjusts a rate at which issue unit issues instructions by adjusting a duty cycle that characterizes the processor clock.

13. A processor comprising:
    one or more functional units; and
    a current control unit to monitor current changes associated with activating and deactivating the one or more functional units and to adjust an activity level of the processor responsive to the monitored current changes, wherein the functional units form an instruction execution pipeline and the processor further includes a pipeline control module to indicate the activity states for the one or more functional units according to types of instructions in the instruction execution pipeline.

14. The processor of claim 13, wherein the current control unit includes a gate unit associated with each of the one or more functional units and each gate unit controls power to its associated functional unit in response to the activity state indicated for the functional unit.

15. The processor of claim 13, wherein the current control unit further comprises a monitor circuit to estimate a current change of the processor using the activity states of the one or more functional units.

16. The processor of claim 15, wherein the monitor circuit weights an activity state for each functional unit according to the current is consumes and sums the weighted activity states for a given clock cycle to provide a total activity state for the clock cycle.

17. The processor of claim 13, wherein the current control unit comprises:
   one or more gate units, each gate unit to control power delivery to an associated one of the functional units and to indicate an activity state for the associated functional unit; and
   a monitor circuit to estimate a current change from the indicated activity states of the one or more functional units.

18. The processor of claim 17, wherein the monitor circuit compares the estimated current change with a threshold value and provides an indication of the comparison.

19. The processor of claim 18, further comprising a throttle circuit to adjust an activity level of the processor responsive to the indicated comparison.

* * * * *